United States Patent
Keslin et al.

(10) Patent No.: US 10,051,020 B2
(45) Date of Patent: Aug. 14, 2018

(54) REAL-TIME DISTRIBUTED COAUTHORING VIA VECTOR CLOCK TRANSLATIONS

(71) Applicant: Microsoft Technology Licensing, LLC., Redmond, WA (US)

(72) Inventors: Michelle Elena Keslin, Kirkland, WA (US); Jitesh Sachdeva, Bellevue, WA (US); Nupur Agarwal, Redmond, WA (US); Victor Kozyrev, Issaquah, WA (US); Ali Taleghani, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 412 days.

(21) Appl. No.: 14/751,686

(22) Filed: Jun. 26, 2015

(65) Prior Publication Data

US 2016/0381099 A1    Dec. 29, 2016

(51) Int. Cl.
*H04L 29/06* (2006.01)
*G06F 17/24* (2006.01)
(Continued)

(52) U.S. Cl.
CPC .......... *H04L 65/4015* (2013.01); *G06F 17/24* (2013.01); *G06Q 10/101* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,656,290 B1 * | 2/2014 | Greenspan | G06F 3/0481 707/608 |
| 2004/0085354 A1 * | 5/2004 | Massand | G06F 17/2229 715/751 |

(Continued)

FOREIGN PATENT DOCUMENTS

| | | |
|---|---|---|
| CN | 103220336 A | 7/2013 |
| WO | 2014005640 A1 | 1/2014 |

OTHER PUBLICATIONS

"International Search Report and Written Opinion Issued in PCT Application No. PCT/US2016/039124", dated Sep. 13, 2016, 13 Pages.

(Continued)

*Primary Examiner* — Philip Chea
*Assistant Examiner* — Hassan Khan
(74) *Attorney, Agent, or Firm* — Merchant & Gould P.C.

(57) ABSTRACT

Systems and methods for improving real-time coauthoring in a distributed environment without a central document manager are disclosed herein. Due to communication being non-instantaneous, the state of a document on an endpoint may differ from the state of the document on an editor at the time that an edit is made. The different states, however, may be reconcilable via a vector clock translation. Each coauthor may maintain an array of vector clocks to track the state of the document for each coauthor. The vector clocks may be included when transmitting indications of edits so that an endpoint in a modified state can translate the edit to comply with the modified state of the document. Translating edits enables more edits to be implement in real-time than otherwise possible in a distributed environment without a central document manager.

14 Claims, 8 Drawing Sheets

(51) Int. Cl.
*G06Q 10/10* (2012.01)
*H04L 29/08* (2006.01)

(56) References Cited

U.S. PATENT DOCUMENTS

| | | | | |
|---|---|---|---|---|
| 2008/0126364 | A1* | 5/2008 | Khosravy | H04L 67/1095 |
| 2012/0233543 | A1* | 9/2012 | Vagell | G06F 17/2288 |
| | | | | 715/255 |
| 2012/0278401 | A1* | 11/2012 | Meisels | G06F 17/24 |
| | | | | 709/206 |
| 2014/0280463 | A1* | 9/2014 | Hunter | G06Q 10/101 |
| | | | | 709/203 |
| 2016/0050177 | A1* | 2/2016 | Cue | H04L 51/34 |
| | | | | 709/206 |
| 2016/0224275 | A1* | 8/2016 | Kato | G06F 3/061 |
| 2016/0328368 | A1* | 11/2016 | Hyams | G06F 17/2211 |

OTHER PUBLICATIONS

Sun et al., "Context-Based Operational Transformation in Distributed Collaborative Editing Systems", In the proceeding of IEEE Transactions on Parallel and Distributed Systems, vol. 20, Issue 10, Oct. 1, 2009, pp. 1454-1470.

Ellis et al., "Concurrency Control in Groupware Systems", In the proceeding of ACM SIGMOD International Conference on Management of Data, vol. 18, Issue 2, Jun. 1989, pp. 399-407.

"Second Written opinion Issued in PCT Application No. PCT/US2016/039124", dated Jun. 2, 2017, 7 Pages.

"What is vector clock?", Retrieved on: Apr. 10, 2015 Available at: http://www.quora.com/What-is-a-vector-clock.

Zhao, et al., "Byzantine Fault Tolerant Collaborative", In Proceedings of IET International Conference on Information and Communications Technologies, Apr. 29, 2013, 8 pages.

Cox, et al., "File Synchronization with Vector Time Pairs", In Technical Report MIT-CSAIL-TR-2005-014, Feb. 2005, 14 pages.

"Simultaneously edit a document with other authors", Retrieved on: Apr. 10, 2015 Available at: https://support.office.com/en-US/Article/Simultaneously-edit-a-document-with-other-authors-2a6059e7-9fe9-4e66-8ecd-f3d5372c27f4.

Vanderveen, Zach, "The Garden of Forking Paths—How Google Docs Works", Published on: Sep. 8, 2013 Available at: http://gardenforkingpaths.blogspot.in/2013/09/how-google-docs-works.html.

Citro, et al., "Conflict Management for Real-Time Collaborative Editing in Mobile Replicated Architectures", In Proceedings of the thirtieth Australasian conference on Computer science, vol. 62, Jan. 30, 2007, pp. 115-124.

Sun, et al., "Achieving Convergence, Causality Presentation, and Intention Preservation in Real-Time Cooperative Editing Systems", In Journal of ACM Transactions on Computer-Human Interaction, vol. 5, Issue 1, Mar. 1998, pp. 63-108.

Sun, et al., "Distributed Concurrency Control in Real Time Cooperative Editing Systems", In Proceedings of Second Asian Computing Science Conference, Dec. 2, 1996, 6 pages.

Katz, Damien, "Conflict Handling using Rev Trees Functional Specifications", Published on: Mar. 26, 2013 Available at: https://github.com/couchbaselabs/cbconflictmgmt/blob/master/revtrees.md.

Lamport, Leslie., "Time, Clock, and the Ordering of Events in a Distributed System", In Magazine of Communications of the ACM, vol. 21, Issue 7, Jul. 1978, pp. 558-565.

"International Preliminary Report on Patentability Issued in PCT Application No. PCT/US2016/039124", dated Oct. 11, 2017, 8 Pages.

* cited by examiner

Mobile Computing Device

REAL-TIME DISTRIBUTED COAUTHORING VIA VECTOR CLOCK TRANSLATIONS

BACKGROUND

The coauthoring of documents, in which editors share edits that are made to a given document, enables users of given systems to collaborate in the creation and editing of documents. Coauthoring, however, can result in edits from multiple authors conflicting (e.g., one author deletes a section being edited by another author). Additionally, different edits made by an editor may require different amounts of processing to faithfully and safely implement on an endpoint. The processing to faithfully and safely implement edits is often time intensive and requires significant amounts of data to be transmitted.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods for enabling real-time distributed coauthoring are disclosed herein. In a coauthoring environment, edits to a document may be shared between an editor and an endpoint. An editor may be a software application or device at which an edit to a document originates, and an endpoint may be a software application or device to which the edit is transmitted for display. As will be understood, multiple editors and endpoints may simultaneously transmit and receive edits to a given document, and a given software application or device may simultaneously be an editor and an endpoint within a coauthoring environment. The systems and methods described herein may be incorporated into the editors and the endpoints.

When an edit is made by the editor, the document displayed on the endpoint may be updated either in real-time or in discrete-time to reflect that edit. Real-time updates enable the endpoint to display or incorporate the edit while it is being made by the editor. In contrast, discrete-time updates enable the endpoint to display edits made since the last discrete-time update occurred. Example discrete-time updates may occur when the document is saved, either on a periodic/scheduled basis (e.g., auto-saved), when a user manually selects to save the document, or when another action occurs that causes the document to be saved. Depending on the frequency of discrete-time updates, the time between entry of a change on the editor and its display on the endpoint may vary.

Real-time updates are transmitted to enable the endpoint to display the editing processes of the editor while the editor makes those edits. As will be understood, because of the distance separating coauthors, the time needed to process the change (both to send and to receive), and the nature of clock cycles in computing devices, there will be a delay between when the editor makes the edit, and when the endpoint attempts to implement the edit; real-time updates are not instantaneous. Within this delay, the endpoint may be making its own edits to the document or implementing edits from other editors, which may affect how the first editor's edit is implemented, or whether it is safe to implement the first editor's edit in real-time. For example, the editor may insert a word into a sentence, but by the time the endpoint is ready to implement the insertion, the sentence may no longer appear like it did when the editor made the edit; modifications may have been made to the sentence during the delay, which the editor was unaware of when the edit was made. Depending on the modifications made, and the edit from the editor, the edit may result in real-time updates being temporarily suspended until a discrete-time update occurs, or real-time updates may continue.

A vector clock translation enables editors and endpoints to account for modifications made during the delay between when an edit is made by an editor and when that edit is implemented by an endpoint, and thus avoid suspending real-time updates. A vector clock for each coauthor is established and transmitted with each edit so that the endpoints can determine how (or whether) to implement edits relative to the current state of the document on the endpoint.

By enabling editors and endpoints to translate the positions of real-time updates in a distributed coauthoring environment, an improved user experience is provided; users of applications or devices that could not otherwise concurrently coauthor all edits to a document are enabled to coauthor a larger subset of edits to documents in real-time and all edits in discrete-time. Additionally, the functionalities of a network, a coauthoring application, and/or another device are improved by reducing network traffic and improving fault tolerance compared to centrally managed coauthoring environments. Additionally, by improving the ability of coauthoring systems to edit in real-time, fewer discrete-time updates are required, lowering network overhead by reducing the amount of data needed to be sent and processed by coauthors. Therefore, a computer using the present disclosure may improve the functioning of the computer itself or affect an improvement in a network or another computer.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1A:
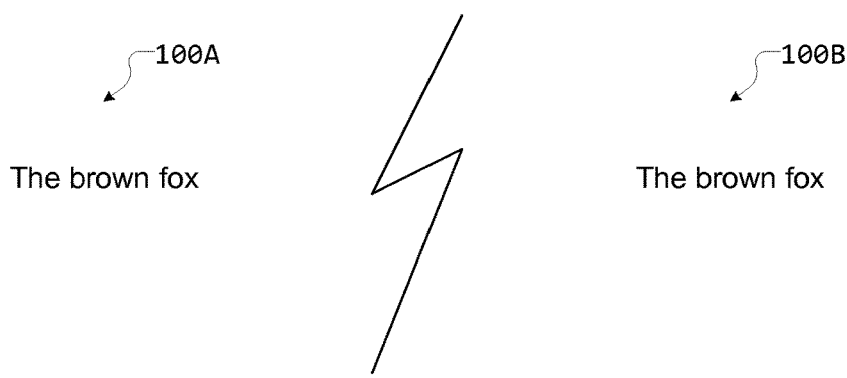
FIGS. 1A-C illustrate a non-near-edit using a vector clock translation to maintain real-time updates.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Systems and methods for enabling real-time distributed coauthoring are disclosed herein. In a coauthoring environment, edits to a document may be shared between an editor and an endpoint. An editor may be a software application or device at which an edit to a document originates, and an endpoint may be a software application or device to which the edit is transmitted for display or incorporation. As will be understood, multiple editors and endpoints may simultaneously transmit and receive edits to a given document, and a given software application or device may simultaneously be an editor and an endpoint within a coauthoring environment. The systems and methods described herein may be incorporated into the editors and the endpoints.

When an edit is made by the editor, the document displayed on the endpoint may be updated either in real-time or in discrete-time to reflect that edit. Real-time updates enable the endpoint to display or incorporate the edit while it is being made by the editor. In contrast, discrete-time updates enable the endpoint to display edits made since the last discrete-time update occurred. Example discrete-time updates may occur when the document is saved, either on a periodic/scheduled basis (e.g., auto-saved), when a user manually selects to save the document, or when another action occurs that causes the document to be saved. Depending on the frequency of discrete-time updates, the time between entry of a change on the editor and its display on the endpoint may vary.

Real-time updates are transmitted to enable the endpoint to display the editing processes of the editor while the editor makes those edits. As will be understood, because of the distance separating coauthors, the time needed to process the edit (both to send and to receive), and the nature of clock cycles in computing devices, there will be a delay between when the editor makes the edit, and when the endpoint attempts to implement the edit; real-time updates are not instantaneous. Within this delay, the endpoint may be making its own edits to the document or implementing edits from other editors, which may affect how the first editor's edit is implemented, or whether it is safe to implement the first editor's edit in real-time. For example, an editor may insert a word into a sentence, but by the time the endpoint is ready to implement the insertion, the sentence may no longer appear like it did when the editor made the edit; modifications may have been made to the sentence during the delay, which the editor was unaware of when the edit was made. Depending on the modifications made, and the edit from the editor, the edit may result in real-time updates being temporarily suspended until a discrete-time update occurs, or real-time updates may continue.

A vector clock translation enables editors and endpoints to account for modifications made during the delay between when an edit is made by an editor and when that edit is implemented by an endpoint, and thus avoid suspending real-time updates. A vector clock for each coauthor is established and transmitted with each edit so that the endpoints can determine how (or whether) to implement edits relative to the current state of the document on the endpoint. In one aspect, vector clock translations enable coauthors at different vector clock states to converge on a single vector clock state for the document and thereby provide continued real-time updates where a previous coauthoring environment may have discontinued real-time updates.

Vector clock translations improve the computing devices and networks involved in a coauthoring environment by reducing the number of machines necessary to coauthor, reducing the data needed to be transmitted and processed, and the improving the reliability of real-time edits. As opposed to coauthoring solutions that rely on a master coauthor or a centralized server providing the document to be coauthored, each of the coauthors using vector clock translations may be peers in a distributed coauthoring environment with equal permissions to the document being coauthored. Additionally, as opposed to coauthoring solutions that compare several different versions of a section to look for commonalities and differences (e.g., the longest common subsequence (LCS) function), vector clock translations reduce the amount of data transmitted between coauthors, enabling them to share edits in real-time and consume less bandwidth and fewer processing resources to incorporate those shared edits.

A vector clock translation enables an edit that affects a section to be sent to a peer coauthor instead of sending an entire section (or subsequence) to a peer or sending an edit to a central server. The shared edit includes a vector clock array (VCA) so that a receiving endpoint can resolve any conflicts between the edit and any modifications made on the endpoint since the editor made the edit. The endpoint may use the VCA to interpret the edit in light of the modification so that the edit is incorporated in the correct position of the affected section. For example, if an editor makes an edit to add text to a paragraph and a modification comprising an addition/deletion of text has changed the addressing scheme of the paragraph, the vector clock translation would enable the edit to be placed properly in the affected paragraph. Vector clock translations thereby enable endpoints to incorporate edits that previously may have caused real-time distributed coauthoring to temporarily be suspended due to conflicts.

By enabling editors and endpoints to translate the positions of real-time updates in a distributed coauthoring environment, an improved user experience is provided; users of applications or devices that could not otherwise concurrently coauthor all edits to a document are enabled to coauthor a larger subset of edits to documents in real-time and all edits in discrete-time. Additionally, the functionalities of a network, a coauthoring application, and/or another device are improved by reducing network traffic and improving fault tolerance compared to centrally managed coauthoring environments. Additionally, by improving the ability of coauthoring systems to edit in real-time, fewer discrete-time updates are required, lowering network overhead by reducing the amount of data needed to be sent and processed by coauthors. Therefore, a computer using the present disclosure may improve the functioning of the computer itself or affect an improvement in a network or another computer.

FIGS. 1A-C and FIGS. 2A-C illustrate different types of edits that may occur in a single section during a coauthoring session. For the purpose of introducing concepts and terminologies used for different types of edits used in the present disclosure, the FIGS. 1A-C and FIGS. 2A-C illustrate individual edits made by two coauthors in a step-by-step fashion. However, discussion of the above example of individual edits made by two coauthors is not intended as limiting the scope of the claimed subject matter. As will be understood, more than two coauthors may share edits in a coauthoring environment and a device or application that is an editor may simultaneously be an endpoint, and vice versa In the examples of FIGS. 1A-C and FIGS. 2A-C, edits made by a first coauthor are illustrated with a bold format and edits made by a second coauthor are illustrated with an italic format to visually differentiate each of the edits from one another and the content that is being edited. As will be understood, coauthors may make edits with or without the formatting illustrated in the various examples or with different formatting than that illustrated (e.g., underlines, strikethroughs, text colors, text sizes, typefaces).

Although the examples given in FIGS. 1A-C and FIGS. 2A-C are in relation to characters/words being added to paragraphs, one of skill in the art will understand from the present disclosure that other content objects may be added or removed from sections of a document including, but not limited to: characters, words, images, charts, tables, active control objects, hyperlinks, and sections. Similarly, the sections are not limited to paragraphs, but may include, but are not limited to: paragraphs, pages, text boxes, cells, columns of cells, rows of cells, tables, worksheets, slides, or other divisions of an electronic document that are separately addressable. One of skill in the art will understand that the electronic document itself (or sections thereof) may have sections added or removed, which may be achieved using the systems and methods of the present disclosure.

In some aspects, when a section is added or removed from the document, or content is added or removed from a section, the coauthor may shift its focus, including the location of a cursor, to account for the addition or deletion. In other aspects, the coauthor may maintain its original focus or lose focus when an edit occurs. The position of the focus may be adjusted similarly to the translation of existing content or sections as discussed in relation to FIGS. 1A-C and FIGS. 2A-C.

Each of the edits discussed in relation to FIGS. 1A-C and FIGS. 2A-C may also be discussed in the present disclosure in relation to vector clocks. A vector clock, as will be understood by one of skill in the art, may be used as a representation of a state of a coauthors' section. A coauthor may be associated with several vector clocks that each represent a corresponding section or represent the document as a whole. Additionally, each coauthor may have an array of vector clocks that reflect its understanding of a given section and what that coauthor believes the state is for the other coauthors for the given section.

Within the present disclosure, for purposes of clarity, vector clocks may be referenced using a format including a coauthor designator and a state designator. For example, the vector clock represented by A0 would represent coauthor "A" (i.e., the first coauthor) and a state of "zero" for a given section, whereas a vector clock represented by B1 would represent coauthor "B" (i.e., the second coauthor) and a state of "one" for a given section. As will be understood, this format is for purposes of explanation within the present disclosure and vector clocks may use other designators, inferred designators, or more detailed designators that differentiate between types of sections, types of users, and/or other possible states than those used for the example format. For example, a state may include a checksum or hash value for the contents of the section and/or a representation of a count of changes made since the last discrete-time update.

Vector clocks may be stored in an array for a given section (or document) that illustrates a given coauthor's understanding of the states of a section relative to each involved coauthor. In the present disclosure, an array of each of the vector clocks for a given section (i.e., its VCA) may be discussed relative to a coauthor designator. For example, the VCA represented by A[A0,B0] indicates that coauthor "A" (i.e., the first coauthor) understands that the section associated with the VCA has a state of zero for both a first coauthor (e.g., A0) and second coauthor (e.g., B0). In another example, the VCA represented by B[A0,B0,C0] indicates that coauthor "B" (i.e., the second coauthor) understands that the section associated with the VCA has a state of zero for the first, second, and third coauthors. As will be understood, as more coauthors are involved in a coauthoring environment, the VCAs will grow into include the associated vector clocks. Similarly, as coauthors leave a coauthoring environment (e.g., by logging off, losing write permissions, timing out) the VCAs may be reduced in size accordingly.

A vector clock may be incremented in response to a change in a coauthor's section or the document. For purposes of clarity in the present disclosure, the symbol "→" will be used to illustrate an incrementation in value for a vector clock. For example, the vector clock for an initial state of a section may be initially set to zero (e.g., A0), and may be incremented to one when the first coauthor makes an edit locally (e.g., A0→A1). Accordingly, the first coauthor's VCA will reflect this edit (e.g., A[A1,B0]). Similarly, when a remote edit is received, the first coauthor's VCA will reflect the new understanding of the second coauthor's state of a section when the remote edit is implemented locally (e.g., A[A1,B0→B1]). When a discrete-time update occurs, each of the coauthors' VCAs will converge (e.g., will reflect the same states in all included vector clocks) as all the active coauthors will have the same understanding of the document. In various aspects, the states of all vector clocks may be reset to zero when they converge in response to a discrete-time update.

Because edits cannot be shared between coauthors instantaneously, due to transmission delays (e.g., the speed of light, network speed) processing delays (for both sending and receiving an edit), the nature of clock cycles, etc., VCAs enable each coauthor to track the causality of events (e.g., edits) in a distributed coauthoring environment and determine how these events may affect one another. When two or more edits are made simultaneously by different coauthors, however, conflicts may arise that can potentially disrupt real-time updates.

The term "simultaneous" in the present disclosure will be understood to be used relative to vector clocks, and not an absolute clock. When edits are made simultaneously (relative to a vector clock), they may be made during a lag period before learning of another coauthor's edit. For example, in a coauthoring environment with a 100 ms lag period (including transmission delays and processing delays) an edit incorporated locally by a first coauthor may be simultaneous to any edits received from remote coauthors made up to 100 ms ago, for which the local edit could not account, or made up to 100 ms in the future, during which time the remote coauthors could not account for the local edit. The edits would be considered simultaneous because the remote coauthor's understanding of the section was the same as the local coauthor's understanding at the time each edit was made. Stated differently, the second coauthor's vector clock for the first coauthor was in the same state as the first coauthor's vector clock was for itself when each coauthor began making their respective edits (e.g., A[A0,B0] and B[A0,B0]) despite the edits not occurring at the same absolute time. As will be understood, more than one remote edit may be considered simultaneous to a local edit and multiple remote edits may be considered simultaneous to each other, such as, for example, when multiple remote coauthors make edits or a single remote coauthor makes multiple edits before the local edit is received by the remote coauthor.

Figure 1B:
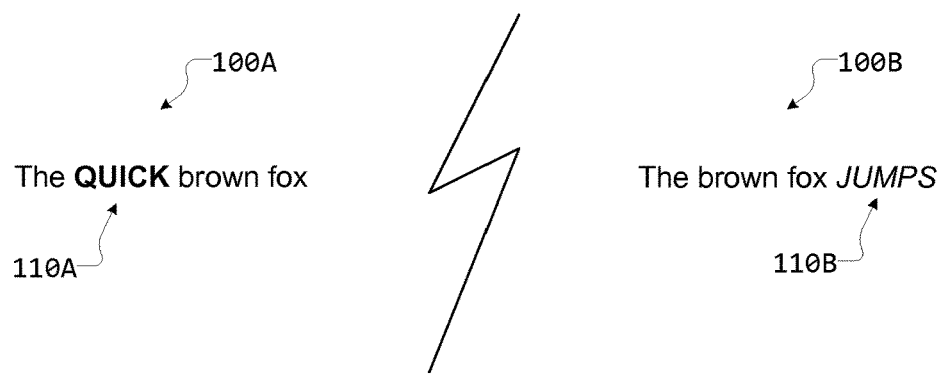
Figure 1C:
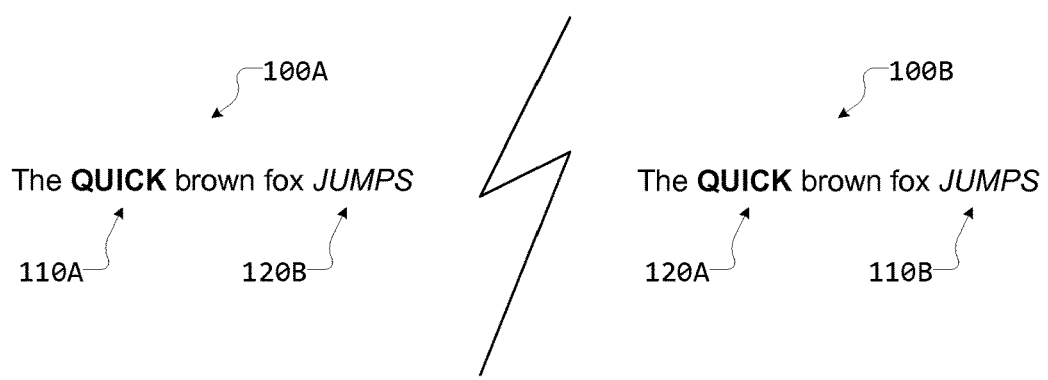

FIGS. 1A-C illustrate a non-near-edit using a vector clock translation to maintain real-time updates. Non-near-edits in a section are those made in the same section, but to different positions in the section. Non-near-edits in a document may also include edits to add or remove sections at different positions. As illustrated, a first coauthor's instance 100A (left) and a second coauthor's instance 100B (right) are depicted as each coauthor makes edits and implements the edits received from the other coauthor. As will be understood, more than two coauthors may share edits in a coauthoring environment and a device or application that is an editor may simultaneously be an endpoint, and vice versa.

FIG. 1A illustrates a beginning state of the section being coauthored. In this state, both the first coauthor's instance 100A and the second coauthor's instance 100B (collectively, coauthors' instances 100) of the section are identical and show the text "The brown fox". The VCAs for each coauthor may reflect a beginning state (e.g., A[A0,B0], B[A0,B0]) or merely be equal to each other (e.g., A[A9,B4], B[A9,B4]). Each coauthor may be provided with an instance 100 of the document being coauthored in real-time, which is broken into sections. In various aspects, sections may include, but are not limited to: paragraphs, lines of text, words, tables, charts, images, image layers, comments, etc.

FIG. 1B illustrates a progression from FIG. 1A in which local edits are incorporated into each of the coauthors' instances 100 of the document being coauthored in real-time. As illustrated, the first coauthor's local edit 110A is to add the word "QUICK" using a bold format (and a space character) and the second coauthor's local edit 110B is to add a space character and the word "JUMPS" using an italic format (collectively, local edits 110).

In the illustrated example, the coauthor's local edits 110 are made simultaneously, such each of the coauthor's instances 100 are now different, and the associated VCAs will have been updated accordingly (e.g., A[A0→A1,B0], B[A0,B0→B1]). When the edit is made locally and real-time updates are active, an indication of the edit is transmitted, along with the local coauthor's VCA for the affected section, to the remote coauthor. For example, the first coauthor may transmit an indication that it has inserted "QUICK<space>" at the fifth position in the given section (i.e., after the space following the word "The"), and the second coauthor may transmit an indication that it has inserted "<space>JUMPS" at the fourteenth position in the given section (i.e., after the word "fox").

In various aspects, the indication may be the actual edit command used by the editor to incorporate the edit locally. For example, the first coauthor's local edit 110A may be incorporated into the first coauthor's backing store with the command insert("QUICK<space>" at 5), which is transmitted to the second coauthor along with the first coauthor's VCA for the affected section. Similarly, the second coauthor's local edit 110B may be transmitted to the first coauthor along with the associated VCA for incorporation in the first coauthor's instance 100A of the document being coauthored.

FIG. 1C illustrates a progression from FIG. 1B in which remote edits 120 received from the other coauthor's instance 100 of the document being coauthored in real-time are locally incorporated with the appropriate translations to position in the local instance. As illustrated, the first coauthor's local edit 110A corresponds to the first coauthor's remote edit 120A in the second coauthor's instance 100B, and the second coauthor's local edit 110B corresponds to the second coauthor's remote edit 120B in the first coauthor's instance 100A.

In the illustrated example, the first coauthor's remote edit 120A may be incorporated into the second coauthor's instance 100B without a translation in position, because a command to insert "QUICK<space>" at the fifth position of the section will still result in the proper display of the remote edit 120 (i.e., after "The<space>"). However, the second coauthor's remote edit 120B from the above example would be inserted into the wrong position of the first coauthor's instance 100A if its position were not translated. Inserting "<space>JUMPS" at the fourteenth position in the first coauthor's instance 100A after the first coauthor's local edit 110A was made would result in the section displaying: "The QUICK brow JUMPSn fox" instead of "The QUICK brown fox JUMPS", which would now require the insertion of "<space>JUMPS" at the twentieth position for it to display after "fox".

To enable remote edits 120 to be incorporated at the proper position in a distributed coauthoring environment in real-time, the indication of an edit may undergo a vector clock translation to account for modifications made to the section that are simultaneous to the remote edit 120. The modifications may be local edits 110 made on the endpoint or remote edits 120 from other coauthors that the editor did not know of when the editor made its edit. The document backing store for each coauthor may store each of the edits made since the last discrete-time update, whether originating locally or remotely, and the associated vector clocks indicating when those edits were made to determine how to implement a vector clock translation.

When a vector clock translation occurs, the endpoint may determine the positions specified in the remote edit 120 and the positions specified by any modifications made since the last discrete-time update (e.g., local edits 110 or other remote edits 120 incorporated earlier in time) and determine whether the modifications affect the positioning of the remote edit 120. For example, the positions for where edits are to be located are compared to determine whether the modifications are "upstream" or "downstream" of the remote edit 120. Remote edits 120 that are upstream of the modifications (i.e., remote edits to which the modifications are downstream) will be incorporated earlier in the addressing scheme of the section being coauthored than the modifications, and therefore the specified positions of their edits will properly place the edit in light of the modifications. Remote edits 120 that are downstream of the modifications, however, may need to have the specified positions of their edits translated to account for the modifications. In various aspects, the upstream/downstream determination may include a comparison of the positions for the edits, where an edit specifying a smaller positional value may be determined to be upstream of an edit specifying a larger positional value (e.g., position 0 is upstream of position 1).

When a remote edit 120 is determined to be upstream of modifications, it may be implemented as originally specified. In the examples illustrated in FIGS. 1A-C, the first coauthor's remote edit 120A is upstream of the modification of the second coauthor's local edit 1106 in the second coauthor's instance 1006. Continuing the above example, the position specified by the first coauthor would remain the fifth position when the first coauthor's remote edit 120A is incorporated into the second coauthor's instance 100B because the modification was made downstream of the first coauthor's remote edit 120A.

When a remote edit 120 is determined to be downstream of modifications, its positional values may be translated to account for any modifications so that it is displayed properly. In the examples illustrated in FIGS. 1A-C, the second coauthor's remote edit 120B is downstream of the modification of the first coauthor's local edit 110A in the first coauthor's instance 100A. To prevent the second coauthor's remote edit 120B from causing the section to display "The QUICK brow JUMPSn fox", the positional value from the second coauthor's remote edit 120B may be translated by the number of characters affected by the upstream modifications (e.g., by six positions downstream in the above example to account for the six characters of the modification to insert "QUICK<space>") for the command to change from insert("<space>JUMPS" at 14) to insert ("<space>JUMPS" at 20). Similarly, if an upstream modification were to delete content, the remote edit 120 may be translated upstream by a corresponding distance. If an upstream modification or combined upstream modifications do not result in a net insertion or removal of remove content (e.g., a formatting change, offsetting additions and deletions), the downstream remote edit 120 may retain its specified position. As will be understood, multiple modifications may have their respective edits combined to determine what distance (and what direction) to translate a downstream remote edit 120, and the combined distance may result in no translation. The remote edit 120 may then be implemented with its specified position translated.

As will be understood, indications of remote edits 120 that include position ranges, rather than discrete positions, may also be similarly translated to account for upstream modifications. For example, a remote edit 120 to apply a bold format to a range of text may have its specified range translated to account for an upstream modification (e.g., format(bold, from 5 to 12)→format(bold, from 8 to 15)). In various aspects, when a specified range overlaps the modification, (e.g., the modification falls within at least a portion of the specified range) the endpoint may either apply the remote edit 120 to the overlapped modification or temporarily suspend real-time updates to the section so that any conflicts between the remote edit 120 and overlapped modification can be resolved in a discrete-time update.

As will also be understood, a remote edit 120 may be positioned between upstream modifications and downstream modifications. Because downstream modifications do not affect the position of the remote edit, the downstream modifications may be ignored when determining what distance or direction to translate the position of the remote edit 120.

Before an endpoint can locally implement a remote edit 120, the transmitted VCA is compared against the local VCA to determine whether the endpoint is in the proper state to implement the remote edit 120. Because edits build upon the section in a distributed coauthoring environment, the transmitted VCA must have a causal relationship with the local VCA for the remote edit 120 to be incorporated. For a causal relationship to exist, the endpoint must have knowledge of all the edits indicated by the transmitted VCA. In a first example, an endpoint having a VCA of A[A0,B0] receiving a transmitted VCA of B[A0,B1] along with the edit that incremented B0→B1 would have knowledge of all the edits indicated by the transmitted VCA, and a causal relationship would exist. Similarly, in a second example, an endpoint having a VCA of A[A2,B0] receiving a transmitted VCA of B[A0,B1] along with the edit that incremented B0→B1 would have knowledge of all the edits indicated by the transmitted VCA and all edits made locally (incrementing A0→A1→A2), and a causal relationship would exist. However, in a third example, an endpoint having a VCA of A[A0,B0] receiving a transmitted VCA of B[A0,B2] along with the edit that incremented B1→B2 would not have knowledge of all the edits indicated by the transmitted VCA because the edit incrementing B0→B1 is not known, as the VCA of A[A0,B0] indicates, and a causal relationship would not exist. Additionally, in a fourth example, an endpoint having a VCA of A[A0,B0,C0] receiving a transmitted VCA of B[A0,B1,C1] along with the edit that incremented B0→B1 would not have knowledge of all the edits indicated by the transmitted VCA because the edit incrementing C0→C1 is not known, as the VCA of A[A0,B0,C0] indicates, and a causal relationship would not exist.

When a causal relationship exists, as indicated by the VCAs, the edit may be incorporated in real-time into the local instance of the document being coauthored. As discussed above, the incorporation may involve translating the position of the remote edit 120 so that it takes into account any modifications incorporated by the endpoint that the editor did not know of before making its edit (e.g., simultaneous edits made by the endpoint or other coauthors).

When a causal relationship does not exist, as indicated by the VCAs, real-time updates may be temporarily suspended. Because the endpoint does not have as full (or fuller) of an understanding of the state of the section as the editor does, implementing the indicated edit may cause aberrant behavior in the section on the endpoint (e.g., not accounting for positional changes affecting the remote edit 120). Stated differently, when the endpoint realizes that its understanding of the section is deficient, it may stop incorporating remote edits 120 in real-time so that it does not display them improperly.

In some aspects, the section being coauthored may be locked when real-time updates are temporarily suspended so that additional edits may not be made locally. In some of these aspects, the lock may be local, so that any remote coauthors that have full understanding of the document may continue to make edits. While in other aspects, the lock may be transmitted to the remote coauthors when one coauthor has an incomplete understanding of the section so that future remote edits 120 do not exacerbate a given coauthor's incomplete understanding.

Real-time updates may be resumed, and any locks to editing removed, when the coauthors regain a complete understanding of the section. Coauthors may regain a complete understanding of the section as a result of a discrete-time update or by receiving a remote edit 120 that was missing from its understanding. For example, when an endpoint receives remote edits 120 out of order from an editor (e.g., B1→B2 before B0→B1) or receives a coauthor's remote edit 120 after the editor received it (e.g., an editor at A[A0,B0,C0] receives an indication with B[A0, B0→B1,C1] before receiving an indication with C[A0,B0, C0→C1]). A coauthor may therefore continue receiving remote edits 120 and cache them for later incorporation even when real-time updates are temporarily suspended so that it might remedy its incomplete understanding of the section before the next discrete-time update occurs.

Similarly, when two or more coauthors add sections to a document, sections that are added earlier in the addressing scheme (i.e., at lower addresses, or "upstream") may affect how and where the sections added later (i.e., at higher addresses, or "downstream") are added to the document. Sections enable a document to be divided into separately addressable portions, and may include paragraphs, pages, text boxes, cells, columns of cells, rows of cells, tables, worksheets, slides, and other divisions of an electronic document that are separately addressable. Stated differently, a document may be considered a special section, in which sections (e.g., paragraphs, tables, pages, cells) are its content. One of skill in the art will therefore be able to apply examples given in respect to content being added to or removed from sections with respect to sections being added to or removed from a document.

Figure 2A:
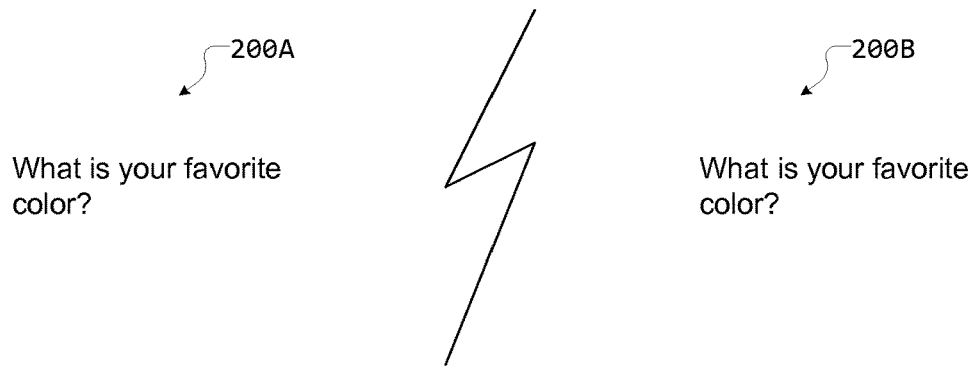
FIGS. 2A-C illustrate a near-edit using a vector clock translation to maintain real-time updates.
Figure 2B:
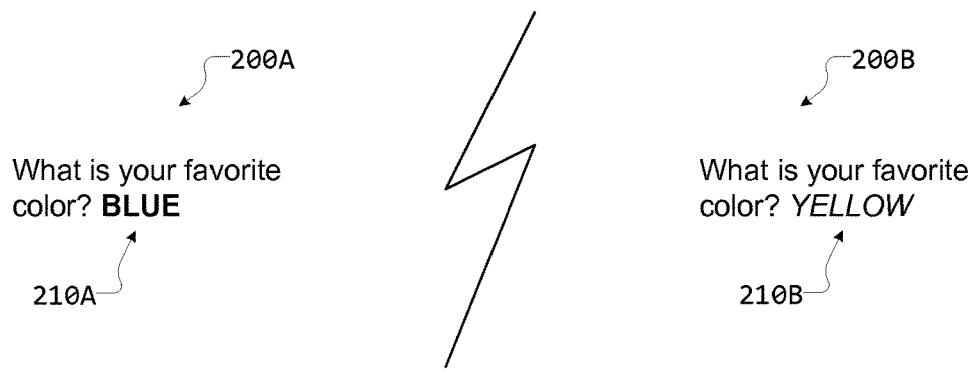
Figure 2C:
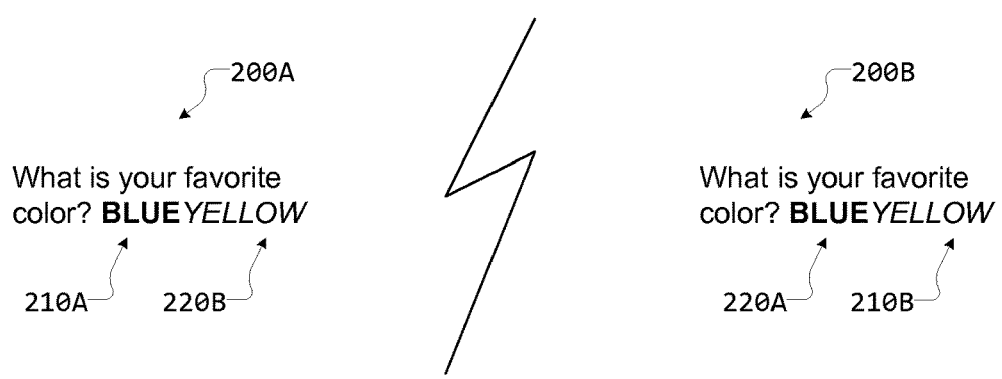

FIGS. 2A-C illustrate a near-edit using a vector clock translation to maintain real-time updates. Near-edits in a section are those made in the same section, and in the same position of that section. Near-edits in a document are those made at the same position of a document (e.g., to add a section at the position or to remove the same section, or a portion of the same section). As illustrated, a first coauthor's instance 200A (left) and a second coauthor's instance 200B (right) are depicted as each coauthor makes edits and implements the edits received from the other coauthor. As will be understood, more than two coauthors may share edits in a coauthoring environment and a device or application that is an editor may simultaneously be an endpoint, and vice versa.

FIG. 2A illustrates a beginning state of the section being coauthored. In this state, both the first coauthor's instance 200A and the second coauthor's instance 200B (collectively, coauthors' instances 200) are identical and show the text "What is your favorite color?". Each coauthor may be provided with an instance of the document being coauthored in real-time, which is broken into sections. In various aspects, sections may include, but are not limited to: paragraphs, lines of text, words, tables, charts, images, image layers, comments, etc.

FIG. 2B illustrates a progression from FIG. 2A in which local edits are incorporated into each of the coauthors' copies of the document being coauthored in real-time. As illustrated, the first coauthor's local edit 210A is to add the word "BLUE" using a bold format and the second coauthor's local edit 210B is to add the word "YELLOW" using an italic format (collectively, local edits 210).

In the illustrated example, the coauthors' local edits 210 are made simultaneously, such each of the coauthors' instances 200 are now different, and the associated VCAs will have been updated accordingly (e.g., A[A1,B0], B[A0, B1]). When the edit is made locally and real-time updates are active, an indication of the edit is transmitted, along with the local coauthor's VCA for the affected section, to the remote coauthor. For example, the first coauthor may transmit an indication that it has inserted "BLUE" immediately after the question mark (i.e., the twenty-ninth position in the section), and the second coauthor may transmit an indication that is has inserted "YELLOW" immediately after the question mark (i.e., the twenty-ninth position in the section).

Near-edits are treated differently than non-near-edits for purposes of position translation. Because near-edits are neither upstream nor downstream of one another based on their specified positions, which are the same, alternative translation schemes are required for near-edits.

FIG. 2C illustrates a progression from FIG. 2B in which remote edits 220 received in real-time from other coauthors' instances of the document being coauthored are locally incorporated. Because the local edits 210 were made at the same position as specified by the remote edits 220, the coauthors may apply various near-edit translation schemes to avoid conflict between the near-edits.

In the illustrated example, the near-edits are displayed as adjacent to each other and in the same order on each coauthor's instance 200. In various other examples, an offset may be introduced to separate the display of the near-edits (e.g., space, tab, slash character, comma characters), but for each coauthor to have the same understanding of the section being edited, the order of the near-edits and the use of offsets must be the same.

Because the coauthors are working in a distributed coauthoring environment, no one coauthor (or central server) has priority to determine how near-edits are to be resolved; each coauthor will need to reach the same determination by itself on how to display the near-edits in their respective instances 200. In various aspects, the order may be based on the VCA, such that the coauthor corresponding to an earlier vector clock in the VCA would have its near-edits displayed first. For example, a first coauthor with vector clocks represented by a first designator "A" may have its near-edits displayed before a second coauthor with vector clocks represented by a second designator "B", and both the first and second coauthors would have their near-edits displayed before a third coauthor with a vector clock represented by a third designator "C", etc. By using the VCA to determine a single order to display near-edits on multiple coauthors' instances 200, the coauthors may avoid having to include timestamps, or other ordering designators, thus reducing network overhead.

To properly set the position of the near-edits, a coauthor may use the order of the coauthors to determine which near-edits are to be upstream or downstream of one another and translate the position of the remote edits 220 accordingly. For example, a first coauthor may be considered upstream of all other coauthors, a second coauthor may be considered downstream of the first coauthor but upstream of all other coauthors, etc. The remote edits 220 from upstream coauthors do not need to be translated; their positions will naturally shift the modification to properly display the remote edits 220 upstream of modifications from downstream coauthors. For example, the first coauthor's remote edit 220A in FIG. 2C may be incorporated according to the specified order indicated by the VCA to appear as it does upstream of the second coauthor's local edit 210B. The remote edits 220 from downstream coauthors, however, are translated by the amount of content added or removed by the upstream modifications to appear downstream of modifications from upstream coauthors at the proper position. For example, the second coauthor's remote edit 220B in FIG. 2C may be translated four positions downstream (as the amount of content added by the first coauthor's local edit 210A occupies four positions) to appear as it does after the first coauthor's local edit 210A. In various aspects where an offset is inserted between near-edits, the content of the remote edit 220 may be translated by any additional positions to account for the insertion of the offset.

Endpoints may use VCAs to incorporate series of remote edits 220 relative to one another in the correct positions. For example, if the first coauthor were to make a series of edits to insert the typing of "BLUE", the first coauthor's VCA would increment from A[A0→A1→A2→A3→A4,B0] as each character is typed, which establishes an order for these edits to be incorporated relative to one another. Similarly, if the second coauthor were to type "YELLOW", its VCA would be updated accordingly (e.g., B[A0,B0→B6]). When the series of remote edits 220 are transmitted to the remote coauthor, because all of the edits in a given series are simultaneous to the first edit in the other series, each will be translated in the order in which it is to be incorporated; i.e. the order in which it was made. For example, the second coauthor's series of remote edits 220B (e.g., insert("Y" at 29), insert("E" at 30), and so forth.) would have each of its specified positions translated by the amount of content added (or removed) by the first coauthor's series of local edits 210A (e.g., by four positions to account for adding "B", "L", "U", and "E" upstream of the second coauthor's edits).

By translating remote edits 220 and incorporating them in the order they were made by the originating coauthor, remote coauthors have the advantage of being able to properly display multiple remote edits 220 made at the same position by a single coauthor. Although endpoints may receive indications of these edits in real-time and in the proper order from a given coauthor, the inclusion of VCAs enables the endpoints to determine the proper order to incorporate edits even when they are received out of order or specify the same position. For example, a coauthor holding down the delete key, or fixing an omission of a character (e.g., typing "BUE" and then moving the focus to type "L" between "U" and "E") may make multiple edits having the same position that can be properly applied, even when received out of order by the endpoint by reference to the vector clocks included in the transmitted VCA.

In aspects where the near-edits affect the same edit to content, the endpoint may effectively incorporate both edits by only actually incorporating one of the edits. For example, if two coauthors deleted the same word from a paragraph or the contents of the same cell, the endpoint will have effectively already incorporated the remote edit 220 by incorporating the local edit 210. Similarly, when the first coauthor deletes an entire sentence, while a second coauthor has deleted a word from that sentence, the edits may overlap and the larger of the two edits may be applied by both coauthors. In some aspects, overlapping edits may cause real-time updates to be temporarily suspended for the affected section so that any conflicts can be resolved in a discrete-time update.

In the event that a conflict cannot be resolved, real-time updates may be temporarily suspended until a discrete-time update occurs. In some aspects, when real-time updates are temporarily suspended, the coauthors may be prompted to save their work in separate files to preserve their edits in the event that the conflict resolution removes or rejects edits.

Figure 3:
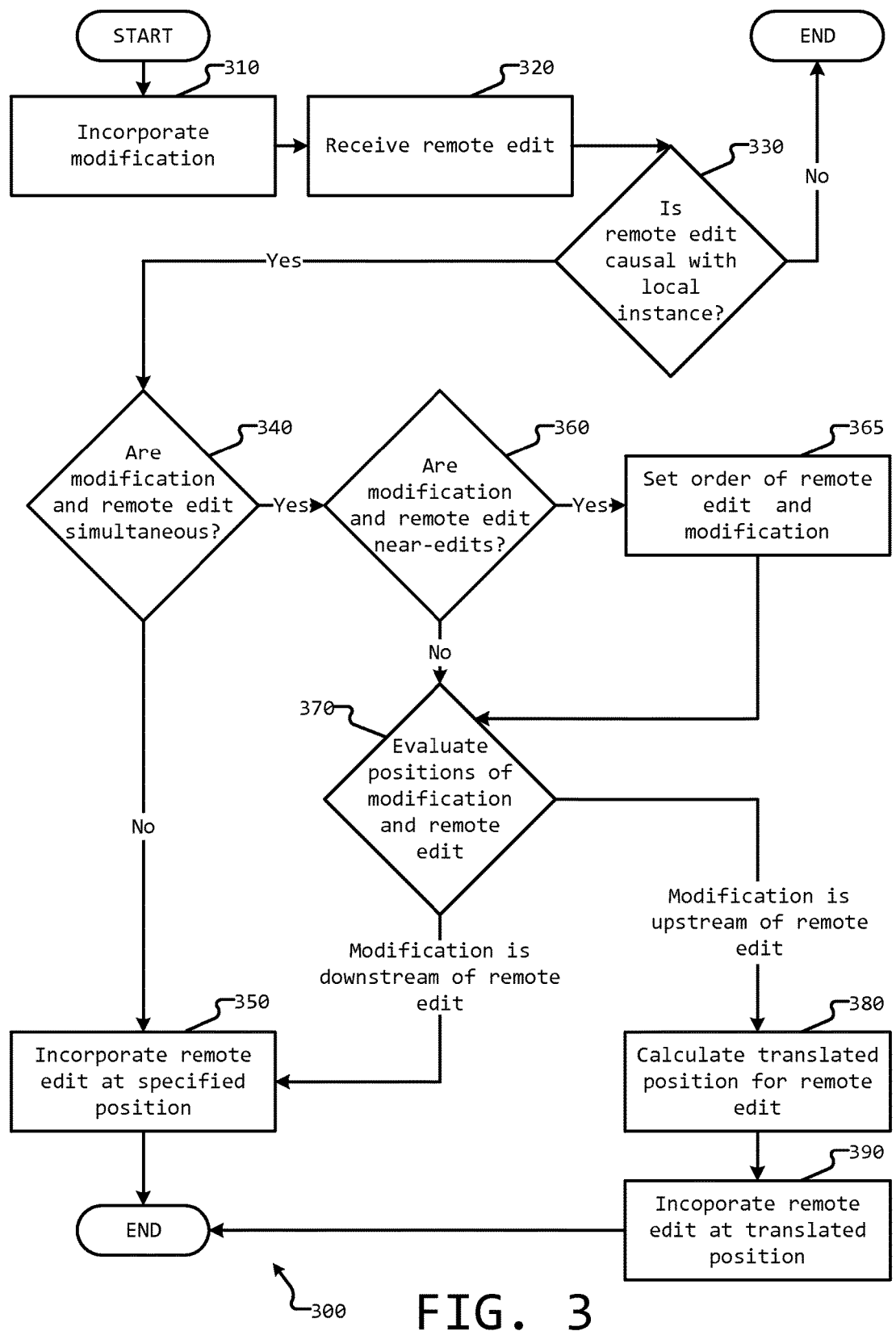
FIG. 3 is a flow chart showing general stages involved in an example method for implementing a vector clock translation for maintaining real-time updates.

FIG. 3 is a flow chart showing general stages involved in an example method 300 for implementing a vector clock translation for maintaining real-time updates. Method 300 starts when a modification is incorporated by an endpoint at OPERATION 310.

The modification incorporated on the endpoint at OPERATION 310 may be a local edit 110 or a remote edit 120. When the modification is a local edit 110, the endpoint may transmit an indication of the local edit 110 to any coauthors in the coauthoring environment for incorporation by those coauthors as a remote edit 120. When the modification is a remote edit 120, as will be understood, the coauthor that is the source of the modification is different from the coauthor that is the source of the remote edit 120 received at OPERATION 320. When the modification is incorporated, the appropriate vector clocks in the endpoint's VCA for the affected section are updated accordingly (e.g., A[A0→A1,B0,C0] for a local edit 110, A[A0,B0,C0→C1] for a remote edit 120). Method 300 then proceeds to OPERATION 320.

At OPERATION 320 the endpoint receives a remote edit 120 and its associated VCA. Method 300 then proceeds to DECISION OPERATION 330, where the transmitted VCA is compared to the local VCA for the document or section being edited to determine whether the remote edit 120 is causal with the local instance and therefore can be incorporated in real-time. If the remote edit 120 lacks a causal relationship with the local instance, for example, by basing the remote edit 120 on information not known the to endpoint, it cannot be safely incorporated in real-time, as doing so will have an unknown effect on the local instance; the remote edit 120 may or may not be placed properly and its misplacement can cascade to negatively affect later-received remote edits 120 and cause aberrant behavior for remote coauthors when transmitting local edits 110 made after the non-causal remote edit 120 is incorporated locally.

If at DECISION OPERATION 330 the remote edit 120 is determined to not be causal with the local instance (e.g., the comparison of VCAs indicate that the local instance is missing information or edits), method 300 ends, such that real-time updates are temporarily suspended until causality is restored. In various aspects, the non-causal remote edit 120 may be retained by the endpoint for later incorporation when causality is restored by a subsequent receipt of a remote edit 120 that fills in any gaps in the local instance's understanding (e.g., other remote edits 120 indicated by the transmitted VCA but not known to the endpoint at the time the remote edit 120 was received at OPERATION 320). Causality is also restored when a discrete-time update or merge operation occurs and thereby sets the state of all instances of the document being coauthored to the same state.

If at DECISION OPERATION 330 the remote edit 120 is determined to be causal with the local instance, method 300 proceeds to DECISION OPERATION 340. At DECISION OPERATION 340 the transmitted VCA is compared with the local VCA to determine whether the remote edit 120 was made simultaneously with the modification.

If at DECISION OPERATION 340 the remote edit 120 is determined to not have been made simultaneously with the modification, the coauthor that made the remote edit 120 is determined to have had knowledge of the modification when making the remote edit 120. Method 300 therefore proceeds to OPERATION 350, where the remote edit 120 is incorporated into the local instance at the specified position and the local VCA is updated accordingly. Method 300 then ends.

If at DECISION OPERATION 340 the remote edit 120 is determined to have been made simultaneously with the modification, the coauthor that made the remote edit 120 is determined to not have had knowledge of the modification when making the remote edit 120. Method 300 therefore proceeds to DECISION OPERATION 360, where it is determined whether the modification and the remote edit 120 are near-edits.

When it is determined at DECISION OPERATION 360 that the modification and the remote edit 120 are near-edits (i.e., the remote edit 120 specifies a position in the document or section to be incorporated at that the modification also specified), method 300 proceeds to OPERATION 365. Otherwise, method 300 proceeds DECISION OPERATION 370.

At OPERATION 365 an order of the remote edit 120 and the modification are set. To ensure that each instance of the document being coauthored displays edits in the same order, when edits are near-edits, an order is set for which near-edit will be considered upstream relative to the other despite the two near-edits specifying the same position in the document or section to be incorporated.

In various aspects, the order set in OPERATION 365 may be based on the arrangement of coauthors in the transmitted VCA or the designation of coauthors in the transmitted VCA. In such aspects, to ensure a shared ordering of coauthors in a distributed coauthoring environment, the order of vector clocks in each coauthor's VCA will be the same, or the designation of each coauthor will be consistent amongst the coauthors; no preference for a local coauthor being a "first" coauthor will be afforded, as all coauthors must agree on how the plurality of coauthors will be ordered. In some aspects, the coauthors may be given an order based on when they joined the coauthoring environment. To prevent simultaneous joining, in some aspects, coauthors may be limited to read-only access to a document being coauthored until a discrete-time update occurs, at which time designators are assigned to each of the coauthors that are consistent throughout the coauthoring environment. After setting an order for the near-edits, method 300 proceeds from OPERATION 365 to DECISION OPERATION 370.

At DECISION OPERATION 370 the relative positions of the remote edit 120 and the modification are evaluated. When evaluating the relative positions of non-near-edits, the positions specified by the remote edit 120 and the modification are compared to determine which is upstream and which is downstream in the section's positioning system. For example, when a modification specifies a lower position in the section's positioning system than the remote edit 120 specifies (e.g., position n for the modification versus position (n+1) for the remote edit 120), the modification is determined to be upstream of the remote edit 120. When evaluating the relative position of near-edits, the order set in OPERATION 365 is used to evaluate which is upstream and which is downstream. For example, when a remote edit 120 precedes the modification in the set order, the remote edit 120 is determined to be upstream of the modification. As will be understood, the concepts of "upstream" and "downstream" are inverse to one another; stating that A is upstream of B is equivalent to stating that B is downstream of A.

When it is determined that the modification is upstream of the remote edit 120, method 300 proceeds to OPERATION 380. At OPERATION 380 a translated position for the remote edit 120 is calculated, whereby the position specified by the remote edit 120 is translated via a vector clock translation to account for the modification and its effects on the section being coauthored. The position specified by the remote edit 120 may be translated upstream or downstream depending on how the modification affected the section. For example, if the modification were to remove content from the section, the remote edit 120 may have its specified position translated upstream (e.g., its specified positional value is decreased) by a factor corresponding to an amount of content removed by the modification. In another example, if the modification were to add content to the section, the remote edit may have its specified position translated downstream (e.g., its specified positional value is increased) by a factor corresponding to an amount of content added by the modification.

Once a remote edit 120 that is determined to be downstream of the modification has a translated position calculated, method 300 proceeds to OPERATION 390, where the remote edit 120 is incorporated into the local instance at the translated position. The local VCA is then updated so that the remote edit 120 may act as a modification to which future remote edits 120 are subject. Method 300 then ends.

When a modification is determined to be downstream of the remote edit 120 at DECISION OPERATION 370, method 300 proceeds to OPERATION 350. Because a modification made downstream of a remote edit 120 does not affect how the specified position of the remote edit 120 will be interpreted in the section, the position specified by the remote edit 120 is used when incorporating the remote edit 120 into the local instance. The local VCA is then updated so that the remote edit 120 may act as a modification to which future remote edits 120 are subject. Method 300 then ends.

Figure 4:
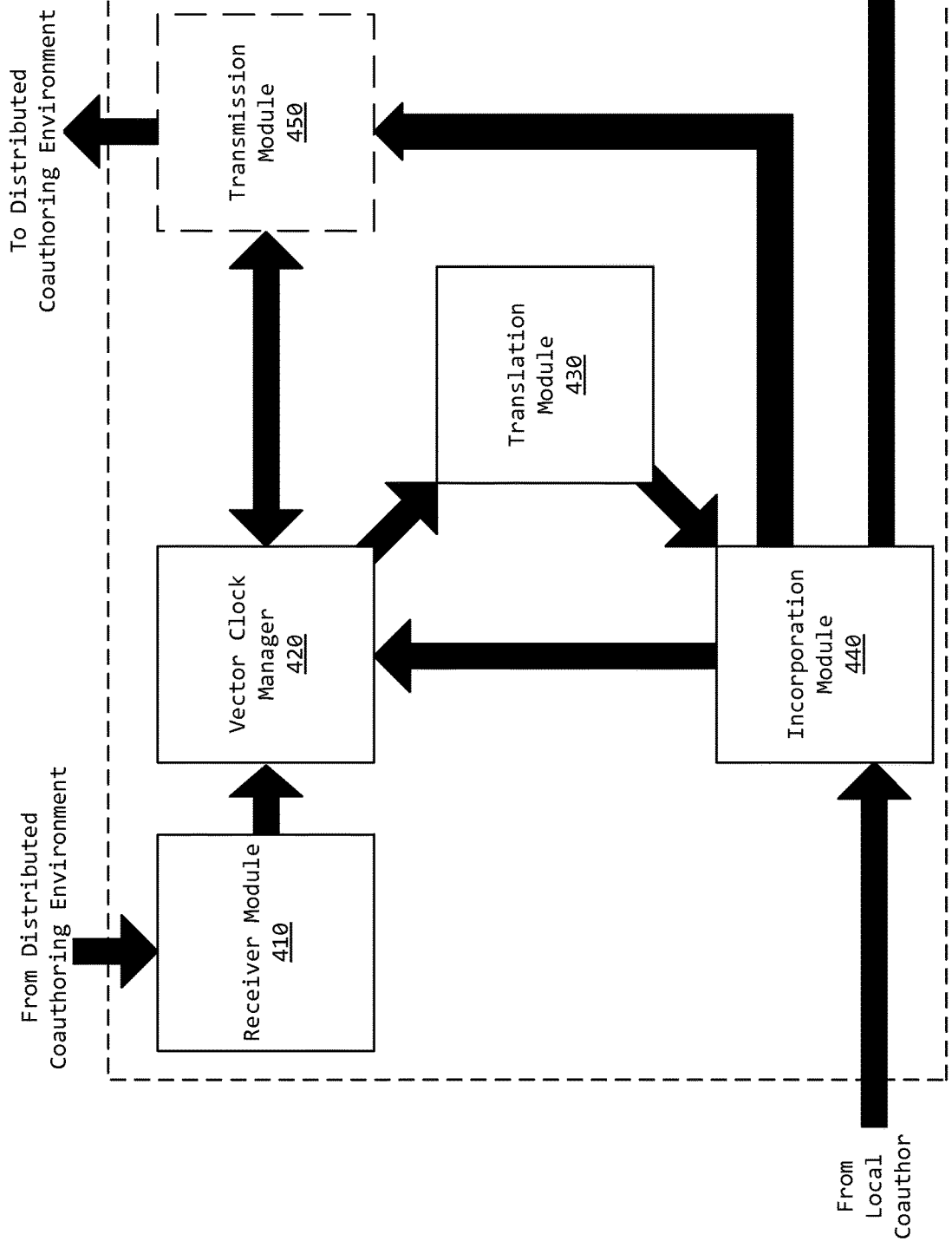
FIG. 4 is a block diagram of a coauthoring engine operable to reduce the need for temporarily suspending real-time edits.

FIG. 4 is a block diagram of a coauthoring engine 400 operable to enable real-time updates to use vector clock translations in a distributed coauthoring environment to reduce the need for temporarily suspending real-time edits to resolve conflicts between edits within the same section. The coauthoring engine 400 may be a standalone program or integrated into a suitable device or application providing authoring features to a user, which may be provided locally or remotely, such as via a cloud service.

As illustrated, the coauthoring engine 400 includes a receiver module 410 operable to receive indications of updates, a vector clock manager 420 operable to track and update vector clocks to determine whether remote edits are causal with the local instance 460 and whether the remote edit 120 is simultaneous to a modification already incorporated into the local instance 460, a translation module 430 operable to translate a position specified by the remote edit 120 into a translated position to account for content added or removed by the modification not known to the maker of the remote edit 120, and an incorporation module 440 operable to incorporate edits into the local instance 460 of the document. In various aspects, the coauthoring engine 400 may also include a transmission module 450 operable to transmit edits made locally to the other instances of the document in the coauthoring environment for real-time updating of those instances.

Each of the modules and/or managers 410-450 are computer-related entities, comprising either hardware, a combination of hardware and software, software, or software in execution on a computer. By way of example but not limitation, a module and/or manager can be implemented as a processor, a process running on a processor, a hard disk drive, multiple storage drives (of optical and/or magnetic storage media), an object, an executable, a thread of execution, a program, and/or a computer.

The receiver module 410 is operable to receive indications of real-time updates from remote coauthors in the coauthoring environment. In various aspects, the receiver module 410 receives the indications over a fast channel used for real-time updates. The indications include a remote edit 120 to incorporate into the local instance 460 and a VCA from the coauthor that made the remote edit 120, which indicates the coauthor's understanding of the document when the remote edit 120 was made.

The receiver module 410 is further operable to receive indications of a discrete-time update or merge operation that occurs on a different channel than the fast channel used for real-time updates. The discrete-time update or merge operation may be accomplished by any of the variety of ways known to those of skill in the art using the appropriate modules and methods to ensure that all of the coauthors in the coauthoring environment are working from the same state of the document once the discrete-time update or merge is complete.

The vector clock manager 420 is in communication with the receiver module 410, and is operable to update and track vector clocks as the document is coauthored. Each section of the document being coauthored is associated with an array of vector clocks (i.e., a VCA) in which each vector clock in the VCA corresponds to a coauthor. When an edit is made by a coauthor to a section, the vector clock manager 420 updates the vector clock associated with that coauthor within the VCA for that section. For example, when a local coauthor makes an edit locally, the incorporation module 440 communicates the edit to the vector clock manager 420, which updates the local coauthor's vector clock accordingly. In another example, when an indication of a real-time update is received from a remote coauthor, the vector clock manager 420 for the receiving coauthor will update the vector clock associated with the remote coauthor when the remote edit 120 is incorporated into the local instance 460. In yet another example, when an indication of a discrete-time update is received, the vector clock manager 420 is operable to reset all the vector clocks (e.g., An→A0, Bn→B0, and so forth) in each of the VCAs for the sections that are updated in discrete-time.

When tracking vector clocks, the vector clock manager 420 is operable to compare the transmitted VCA with the local VCA for the corresponding section. From this comparison, the vector clock manager 420 is operable to determine whether the remote edit 120 is causal with the local instance 460, and whether it was made simultaneously to a modification already incorporated into the local instance 460.

A remote edit 120 is determined to be non-causal when its transmitted VCA indicates that it was based on a different understanding of the document than the local instance 460 includes. For example, the vector clock manager 420 of a local coauthor that receives a second remote edit from a remote coauthor without receiving the first remote edit would determine the second remote edit to be non-causal. In terms of VCAs, the local coauthor's VCA may initially be A[A0,B0], the second remote edit's VCA may be B[A0,B2], and the first remote edit's VCA may be B[A0,B1] such that the causal chain of edits would be B0→B1→B2. In another example, a first coauthor that lacks knowledge of an edit made by a third coauthor that has already incorporated by second coauthor would be determined an edit received from the second coauthor to be non-causal. In terms of vector clocks, the first coauthor's vector clock manger 420 may compare its local VCA of A[A0,B0,C0] to the transmitted VCA of B[A0,B1,C1] to determine that it lacks an understanding that includes the operation that incremented C0→C1.

A remote edit 120 is determined to be simultaneous to a modification when its transmitted VCA indicates that it was based on the understanding of the document that the modification was based on. For example, the vector clock manager 420 may receive a first remote edit from a first remote coauthor having a VCA of B[A0,B1,C0] and a second remote edit from a second remote coauthor having a VCA of C[A0,B0,C1] that indicate that each remote edit was made from a VCA of a base of [A0,B0,C0] (e.g., B0→B1 and C0→C1). Similarly, the vector clock manager 420 may compare a local VCA to the transmitted VCA to determine whether a local edit 110 is simultaneous to the remote edit 120.

As will be understood, a remote edit 120 may also be determined to be causal and non-simultaneous. For example, a first coauthor may make an edit (e.g., A[A0→A1,B0]) and transmit it to a second coauthor that incorporates the edit (e.g., B[A0→A1,B0]). The second coauthor then makes a subsequent edit (e.g., B[A1,B0→B1]) that is transmitted to the first coauthor for subsequent incorporation (e.g., A[A1, B0→B1]). In this example, the transmitted edits are causal, but the edits are not simultaneous because the second edit was made after the first was incorporated, and the second coauthor had knowledge of the first edit when making the second edit.

The translation module 430 is in communication with the vector clock manager 420 and the incorporation module 440, and is operable to determine how a remote edit 120 is to be handled by the incorporation module 440 and signal the incorporation module 440 accordingly. To determine how to handle the remote edit 120, the translation module 430 uses the determinations of causality and simultaneity made by the vector clock manager 420, and may calculate a translated position to incorporate the remote edit 120 into the local instance 460.

When a remote edit 120 has been determined to be non-causal with the local instance 460, the translation module 430 handles the remote edit 120 by indicating to the incorporation module 440 that real-time updates are to be temporality suspended, and that the non-causal remote edit 120 and any subsequent edits are not to be incorporated until real-time updates are resumed when causality is restored. In various aspects, the non-causal remote edit 120 may be retained so that a subsequently received (but prior-made) remote edit 120 can be used to link the state of the document to the non-causal remote edit 120 and restore causality. For example, if a first edit and a second edit are received out of order, retaining the second edit until the first edit is received and incorporated will allow for the second edit to be incorporated, at which time real-time updates may resume. Real-time updates may also resume after a discrete-time update or a merge operation.

When a remote edit 120 is causal with the local instance 460, but not simultaneous to any modification already incorporated into the local instance 460, the translation module 430 will signal the incorporation module 440 to incorporate the remote edit 120 at the position that it specified.

When a remote edit 120 is causal with the local instance 460 and simultaneous to a modification already incorporated into the local instance 460, the translation module 430 will determine whether to translate the position of the remote edit 120. The translation module 430 will compare the specified position of the remote edit 120 to the position that the modification was incorporated into the local instance 460 to determine whether to translate the specified position to account for any content added or removed by the modification that will affect the incorporation of the remote edit 120.

When the modification has been incorporated downstream of the remote edit 120 in the positioning scheme, any content added or removed by the modification will not affect the positioning of the remote edit 120. Therefore, the translation module 430 will signal the incorporation module 440 to incorporate the remote edit 120 at the position that it specified.

When the modification has been incorporated upstream of the remote edit 120 in the positioning scheme, any content added or removed by the modification may affect the positioning of the remote edit 120. Therefore, the translation module 430 will tally the content added and removed at each state back to the common understanding from which that the remote edit 120 and the modification were made. For example, when a local coauthor has incorporated a series of local edits 110 as modifications that are upstream of and simultaneous to the remote edit 120, each of the local edits 110 will have their effect on the positioning scheme tallied when determining how to translate the specified position of the remote edit 120. For example, when a local coauthor types "hello", its vector clock would advance once for each letter typed (e.g., A0→A1 for "h", A1→A2 for "e", and so forth), and a remote edit 120 received with a VCA indicating that it had no knowledge of the local edit 110 at the time the remote edit was made (i.e., containing A0) would be affected by each letter typed from the current state (i.e., A5) back to the common understanding (i.e., A0). In this example, the translation module 430 would tally the five additions of content from the modifications and use the tally to translate the specified position of the remote edit 120 into a translated position that is operable to correctly place the remote edit 120 in the local instance 460 in light of the modification. In aspects where the tally corresponds to the number of positions in the positioning scheme affected by the modification's addition or removal of content (positively or negatively affected, respectively), the translated position may be created by adding the tally to the specified position. As will be understood, modifications that add content will result in a translated position downstream of the specified position, modifications that remove content will result in a translated position upstream of the specified position, and modifications that offset (i.e., equal amounts of content are added and removed) or do not add/remove content (e.g., formatting, inserting comments) will result in a translated position equal to the specified position.

In a special case, where the modification and the remote edit 120 are made to the same position (i.e., are near-edits), the translation module 430 will determine an order to set the remote edit 120 relative to the modification. This order will be the same for all coauthors in the distributed coauthoring environment such that the coauthoring engines 400 for each coauthor will independently be able to come to the same order to set the near-edits. In one aspect, the order of vector clocks in each VCA may the same for each coauthor in the distributed coauthoring environment, which the translation module 430 may use to set the order for near-edits. For example, the vector clocks for a first coauthor (i.e., An) and a second coauthor (i.e., Bn) may appear in the same order in each coauthor's VCA (i.e., A[An,Bn] and B[An,Bn]) such that near-edits made by the first and second coauthors will be ordered according the order of vector clocks. Each coauthor, therefore, would set the order of the near-edit made by the first coauthor upstream of the near-edit made by the second coauthor. When a remote edit 120 is set as downstream of the modification, it will have a translated position calculated for use when incorporating the remote edit 120.

When near-edits are made, the translation module 430 is further operable to apply an offset to the remote edit 120. In some aspects, no offset is applied, while in other aspects, a space, tab, slash, comma or other designated characters may be inserted between the near-edits. When the remote edit 120 is upstream of the modification, the offset is applied at the end of the remote edit 120 (e.g., <remote edit><offset>), whereas when the remote edit 120 is downstream of the modification, the offset is applied at the beginning of the remote edit 120 (e.g., <offset><remote edit>). As will be understood, the translated position for the downstream remote edit 120 will take any offset applied into account.

As illustrated, the incorporation module 440 is in communication with the vector clock manager 420 and the translation module 430. The incorporation module 440 is operable to incorporate local edits 110 from a local coauthor and remote edits 120 from remote coauthors into the local instance 460 in real-time. In various aspects, the incorporation module 440 incorporates the edits as they are received (i.e., in real-time) whereby the editing process is displayed while it occurs. Edits are incorporated as indicated by the translation module 430 so that remote edits 120 are incorporated at a position that takes into account modifications already incorporated into the local instance 460. As edits are incorporated, the incorporation module 440 indicates their incorporation to the vector clock manager 420 to increment the vector clocks in the appropriate VCAs accordingly.

A transmission module 450 is also illustrated in communication with the vector clock manager 420 and the incorporation module 440. The transmission module 450 is operable to transmit local edits 110 that have been incorporated into the local instance 460, and the correspondingly updated VCA, to the remote coauthors participating in the distributed coauthoring environment. In various aspects, the local edits 110 that are transmitted are transmitted as-is, so that the remote coauthors using the same or similar backing store model as the local coauthor can implement the edit as transmitted. For example, the command of "insert ("QUICK<space>" at 5)" used by the local coauthor to insert "QUICK" at a fifth position in a given section may also be used by a remote coauthor using a similar backing store model, and therefore is transmitted as-is. In other aspects, where the coauthors may use different backing store models, the transmission module 450 is operable to convert the commands and structures of the local edit 110 into a format intelligible by the remote coauthors. For example, a eXtensible Markup Language (XML) format or Java Script Object Notation (JSON) format may be used.

The incorporation module 440 is further operable to temporarily suspend the real-time editing of the document (or a section thereof) when an edit cannot be safely incorporated in real-time. For example, a remote edit 120 may be determined to be non-causal with the local instance 460 or a remote coauthor may indicate that a section is locked or the local coauthor otherwise lacks permissions to edit the given section.

When the incorporation module 440 has temporarily suspended editing, local edits 110 cannot be made to any section in which editing has been suspended, although any pending remote edits 120 may be incorporated into the local instance 460 or cached for later incorporation. A pending remote edit 120 may be understood as a remote edit 120 that is simultaneous to a missing remote edit 120 from the causal chain of edits. For example, if the edit associated with the VCA of B[A0,B1,C0] is missing, any further edits by the second coauthor will be non-causal (e.g., B1→B2, B2→B3, and so forth), but any edits by a third coauthor that indicate a vector clock of B0 would be simultaneous to the missing edit B0→B1, and are therefore pending remote edits 120 that may be incorporated safely. When remote edits 120 are cached by the incorporation module 440, they are queued according to their vector clocks so that if editing is resumed (e.g., in the event that a missing edit is received), they may be appropriately incorporated into the local instance 460. When remote edits 120 are discarded, remote editing will not be resumed until a discrete-time update or merge operation occurs.

The coauthoring engine 400 as described herein is operable to improve the operation of the computing devices on which it is run, and the operation of the distributed coauthoring environment of which those computing devices are a part by reducing network traffic and improving fault tolerance compared to centrally managed coauthoring environments. Additionally, the coauthoring engine 400 enables an improved user experience in a distributed coauthoring environment by enabling a larger subset of edits to be concurrently made within sections of a document in real-time. Moreover, by improving the ability of coauthoring systems to edit in real-time, fewer discrete-time updates are required, further lowering network overhead by reducing the amount of data needed to be sent and processed by coauthors. Therefore, a computing device using the present disclosure may improve the functioning of the computer itself or affect an improvement in a network or another computer.

While the present disclosure has been described in the general context of program modules that execute in conjunction with an application program that runs on an operating system on a computer, those skilled in the art will recognize that examples and aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
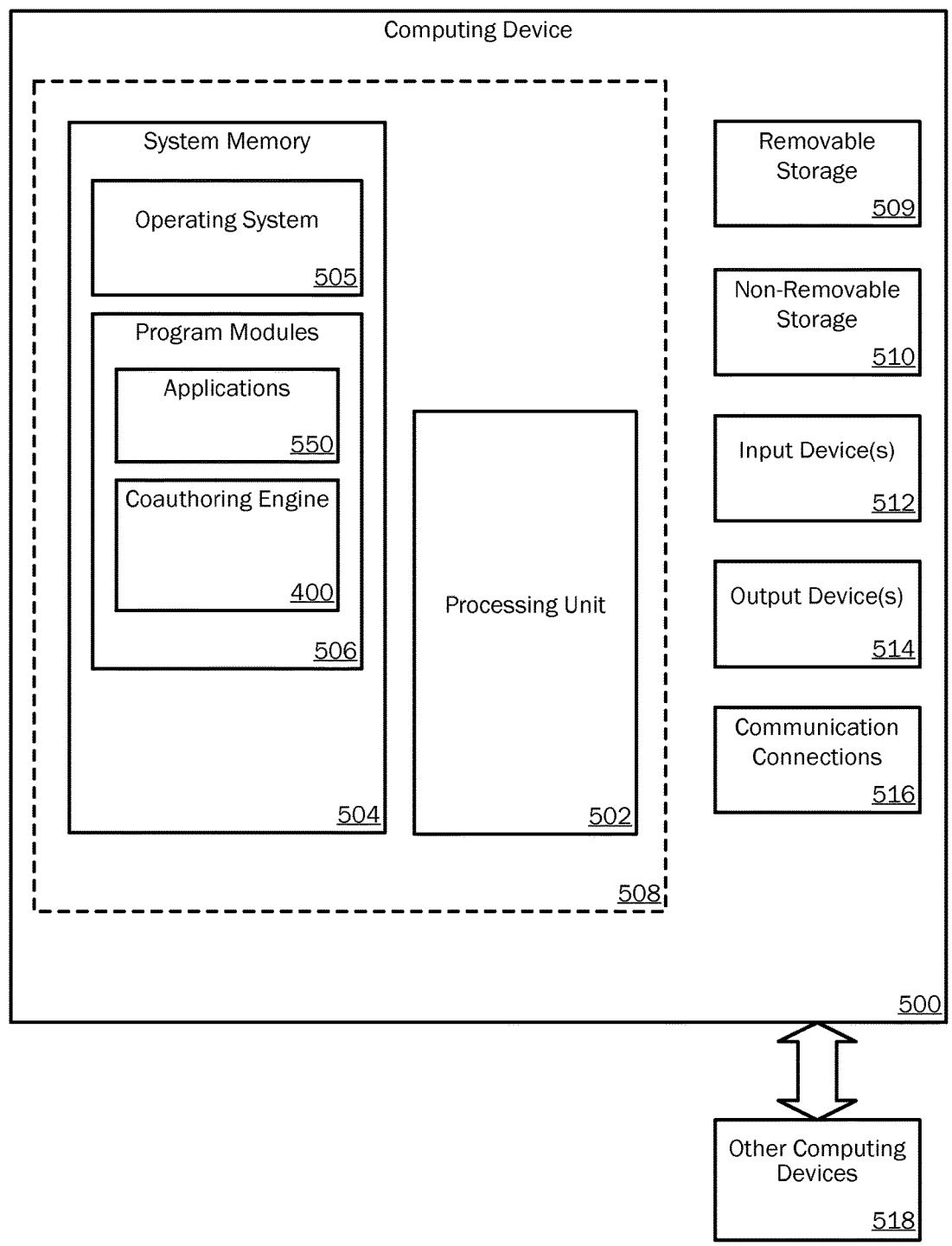
FIG. 5 is a block diagram illustrating physical components of a computing device with which examples may be practiced.
Figure 6A:
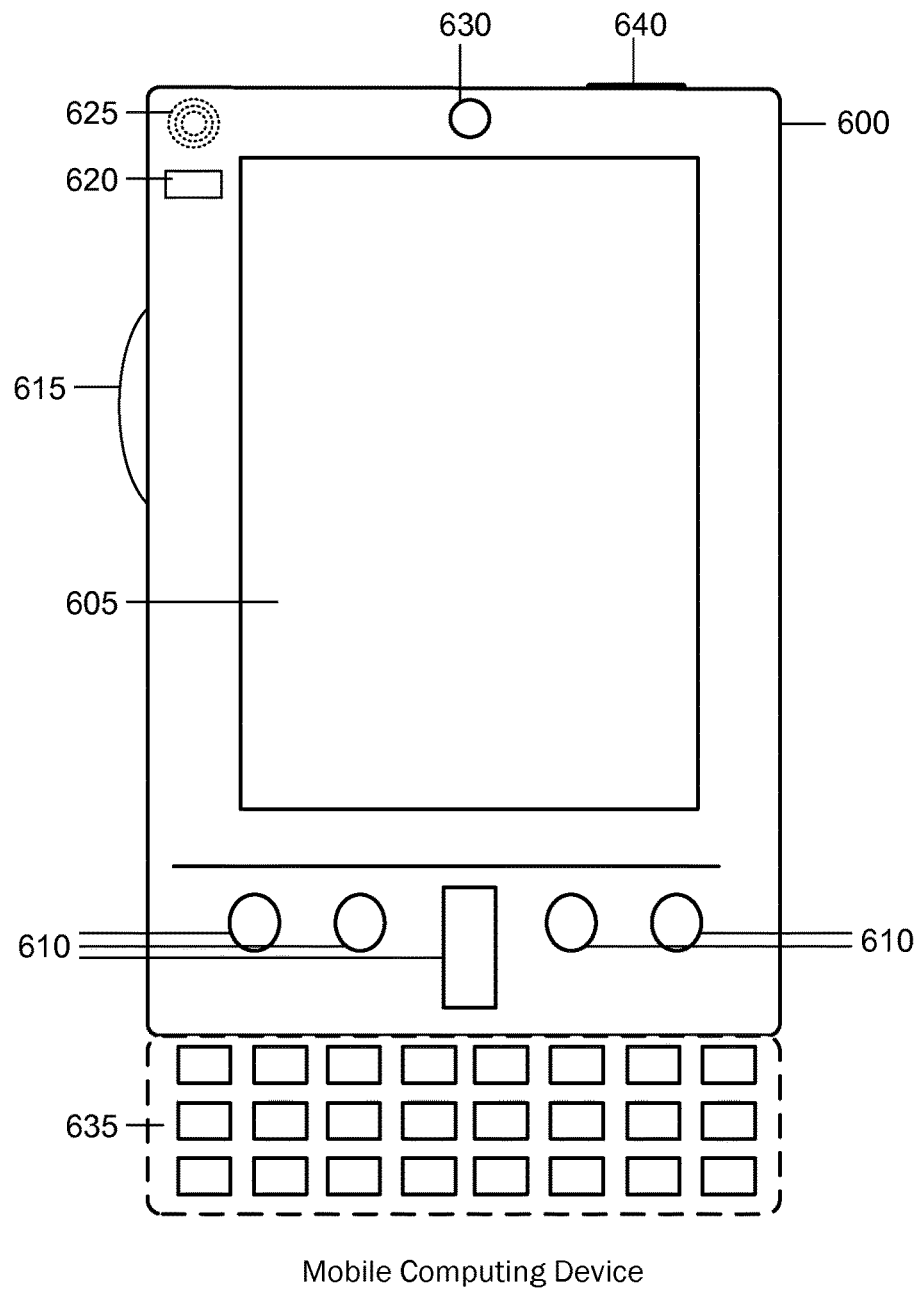
FIGS. 6A and 6B are block diagrams of a mobile computing device with which aspects may be practiced.
Figure 6B:
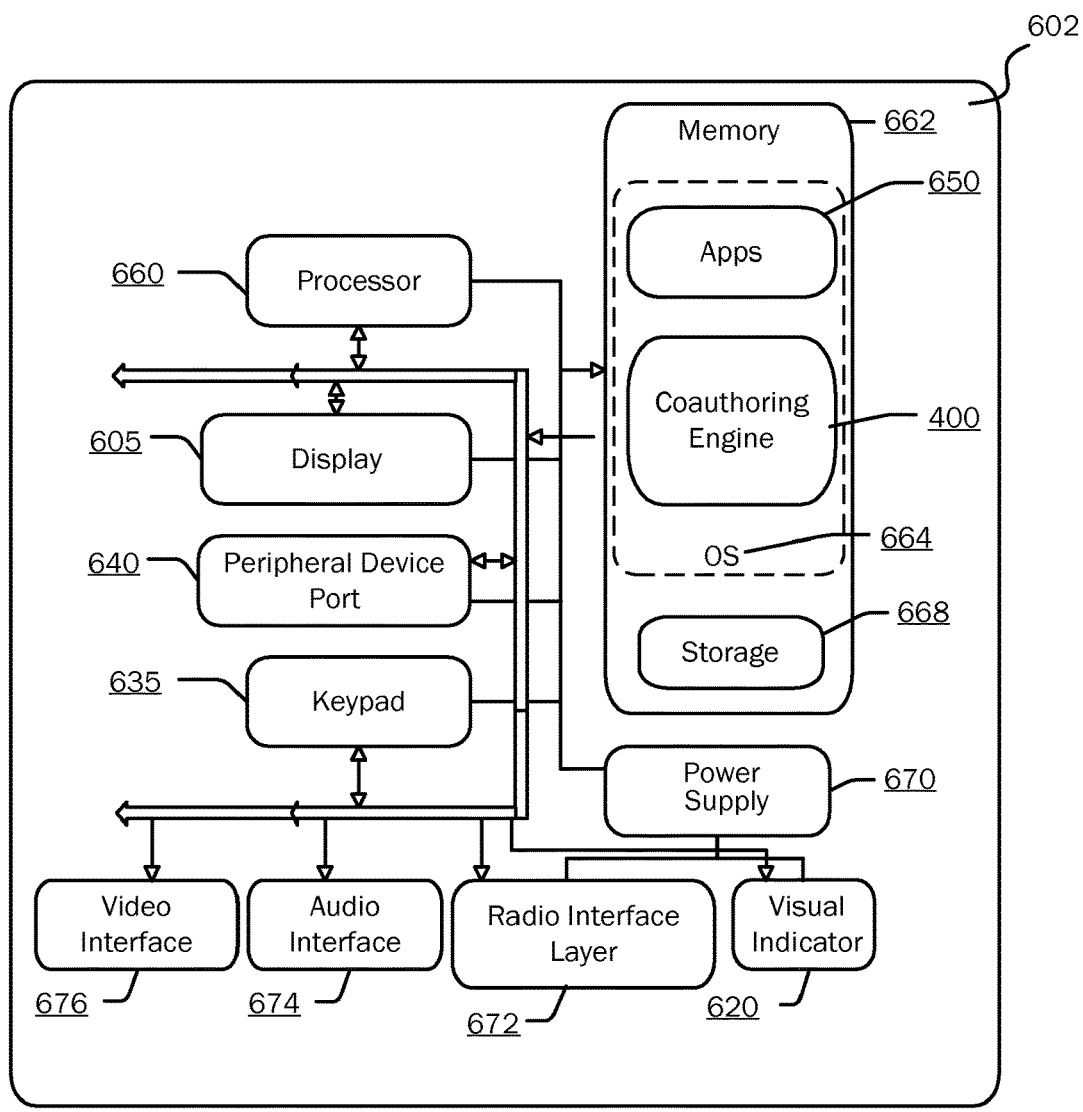
Figure 7:
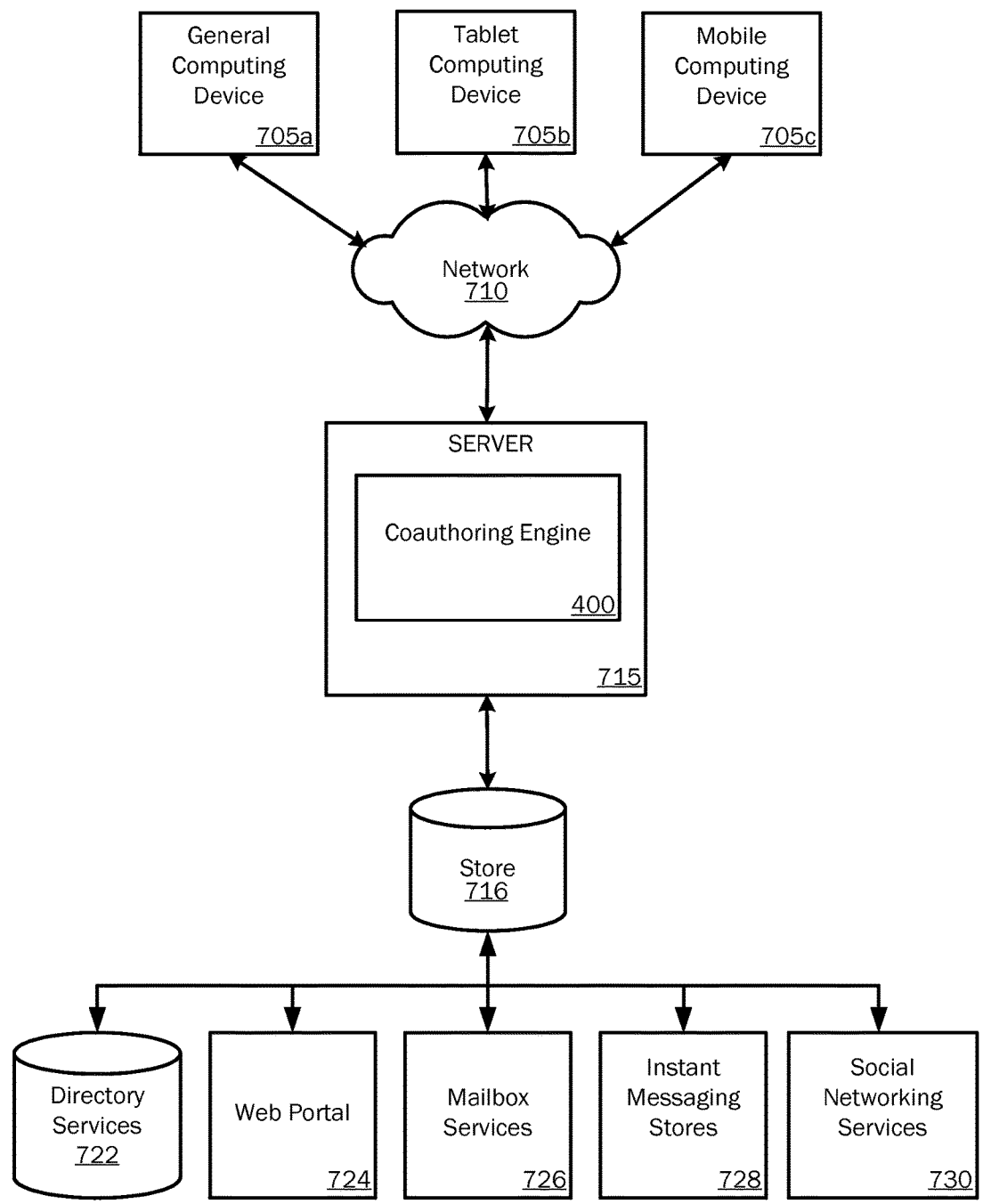
FIG. 7 is a block diagram of a distributed computing system in which aspects may be practiced.

FIGS. 5-7 and the associated descriptions provide a discussion of a variety of operating environments in which examples may be practiced. However, the devices and systems illustrated and discussed with respect to FIGS. 5-7 are for purposes of example and illustration and are not limiting of a vast number of computing device configurations that may be utilized for practicing aspects of the present disclosure.

FIG. 5 is a block diagram illustrating physical components (i.e., hardware) of a computing device 500 with which examples may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550, such as editors and endpoints. According to an aspect, the system memory 504 may include the coauthoring engine 400. The operating system 505, for example, may be suitable for controlling the operation of the computing device 500. Furthermore, aspects may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., editors, endpoints, coauthoring engine 400) may perform processes including, but not limited to, one or more of the stages of the method 300 illustrated in FIG. 3. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples may be practiced in an electrical circuit comprising discrete electronic elements, packaged or integrated electronic chips containing logic gates, a circuit utilizing a microprocessor, or on a single chip containing electronic elements or microprocessors. For example, examples may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, or transceiver circuitry; universal serial bus (USB), parallel, or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), or an audio transducer 625 (e.g., a speaker). In some examples, the mobile computing device 600 incorporates a vibration transducer for providing the user with tactile feedback. In yet another example, the mobile computing device 600 incorporates peripheral device ports 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 650, for example, editors and endpoints, may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the coauthoring engine 400 may be loaded into memory 662. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

The visual indicator 620 may be used to provide visual notifications or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing data visualization as described above. Content developed, interacted with, or edited in association with editors, endpoints, or the coauthoring engine 400 may be stored in different communication channels or other storage types. For example, various documents may be stored using a directory service 722, a web portal 724, a mailbox service 726, an instant messaging store 728, or a social networking site 730. The editors, endpoints, or the coauthoring engine 400 may use any of these types of systems or the like for providing data visualization, as described herein. A server 715 may provide editors, endpoints, or the coauthoring engine 400 to clients 705A-C. As one example, the server 715 may be a web server providing the editors, endpoints, or the coauthoring engine 400 over the web. The server 715 may provide the editors, endpoints, or the coauthoring engine 400 over the web to clients 705 through a network 710. By way of example, the client computing device may be implemented and embodied in a personal computer 705A, a tablet computing device 705B or a mobile computing device 705C (e.g., a smart phone), or other computing device. Any of these examples of the client computing device may obtain content from the store 716.

Aspects of the present disclosure, for example, are described above with reference to block diagrams or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The aspects, examples, and details provided in this application are considered sufficient to convey possession and enable others to make and use the best mode of present disclosure. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A computing device, wherein the computing device is a first endpoint computing device, the first endpoint computing device participating in a coauthoring session of an electronic document, wherein during the coauthoring session an edit is made to a first instance of the electronic document at the first endpoint computing device by a first user while, substantially simultaneously, an edit is made to a second instance of the electronic document at a second endpoint computing device by a second user, and wherein the edit made to the second instance of the electronic document is transmitted in real time from the second endpoint computing device to the first endpoint computing device, the computing device comprising:

a processor; and a memory device including instructions which when executed by the processor cause the system to provide a coauthoring engine including:

an incorporation module operable to incorporate the transmitted edit into the first instance of the document;

a receiver module, operable to receive an indication of a real-time update, the indication of the real-time update including the transmitted edit, wherein the transmitted edit specifies a position in which to be incorporated in the first instance of the electronic document;

a translation module in communication with the incorporation module, the translation module operable to determine whether the transmitted edit is prior in time to the edit made to the first instance of the electronic document, in response to determining that the transmitted edit is prior in time to the edit made by the first user in the first instance of the electronic document, the translation module being operable to signal the incorporation module to incorporate the remote edit at the specified position while maintaining a real time reception of a subsequent edit transmitted from the second endpoint computing device; and in response to determining that the remote edit is later in time to the edit made by the first user in the first instance of the electronic document, the translation module being operable to calculate a translated position to incorporate the transmitted edit in the first instance of the electronic document based on the specified position and an amount of content affected by the edit made by the first user in the first instance of the electronic document, and the translation module being operable to signal the incorporation module to incorporate the transmitted edit at the translated position while maintaining a real time reception of a subsequent edit transmitted from the second endpoint computing device;

the coauthoring engine further including:

a vector clock manager in communication with the receiver module, the translation module, and the translation module, the vector clock manager operable to track and update vector clocks to determine whether the transmitted edit can be implemented in the first instance of the electronic document without additional edits transmitted from the second endpoint computing device; and wherein, in response to the vector clock manager determining that the transmitted edit cannot be implemented in the first instance of the electronic document without additional edits transmitted from the second endpoint computing device, the incorporation module is further operable to temporarily suspend entry of additional edits by the first user at the first instance of the electronic document.

2. The computing device of claim 1, wherein the edit made by the first user to the first instance of the electronic document has been incorporated into the first instance by the incorporation module.

3. The computing device of claim 1, wherein the receiver module is operable to determine a section of the second instance of the electronic document that the transmitted edit was made to, wherein the section is one of:
a paragraph;
a page;
a text box;
a cell;
a column of cells;
a row of cells;
a table;
a worksheet; and
a slide.

4. The computing device of claim 1, wherein temporarily suspending entry of additional edits by the first user at the first instance of the electronic document includes suspending entry of additional edits by the first user to a specific section of the first instance of the electronic document, wherein the specific section is associated with the transmitted edit.

5. The computing device of claim 1, wherein, in response to temporarily suspending entry of additional edits by the first user at the first instance of the electronic document, the incorporation module is further operable to cache the transmitted edit until the vector clock manager determines that a subsequently transmitted edit from the second endpoint computing device enables the transmitted edit to be implemented in the first instance of the electronic document; and wherein, in response to the vector clock manager determining that the subsequently transmitted edit from the second endpoint computing device enables the transmitted edit to be implemented in the first instance of the electronic document, the incorporation module is further operable to resume editing by the first user at the first instance of the electronic document by incorporating the subsequently transmitted edit and the transmitted edit.

6. The computing device of claim 1, the coauthoring engine further including:
a transmission module in communication with the incorporation module, operable to transmit to the second endpoint computing device the edit made by the first user, the transmitted edit made by the first user specifying a position in the first instance of the electronic document where it was made and including a local vector clock array, wherein the local vector clock array indicates an understanding of the first instance of the electronic document at the time the edit was made by the first user in the first instance of the electronic document.

7. The computing device of claim 1, wherein the indication of the transmitted edit from the second endpoint computing device further includes an array of vector clocks, wherein the array of vector clocks indicate an understanding of the second instance of the electronic document being coauthored at the time the second edit was made by the second user.

8. The computing device of claim 7, wherein the transmitted edit comprises an edit that was made at a same section and a same position in the second instance of the electronic document as the first edit in the first instance of the electronic document, the translation module is further operable to set an order of implementation within the first instance of the electronic document of the transmitted edit and the first edit, such that one of the transmitted edit and the first edit is determined to be prior in time of the other based on an order of vector clocks in a vector clock array (VCA) that is shared between the first endpoint computing device and the second endpoint computing device.

9. The computing device of claim 8, wherein the translation module is further operable to insert an offset between the transmitted edit and the first edit when the transmitted edit is the edit that was made at the same section and the same position in the second instance of the electronic document as the first edit in the first instance of the electronic document.

10. A computer-implemented method enabling an endpoint computing device to resolve placement of an edit occurring in a coauthoring session of an electronic document, wherein a first endpoint computing device is participating in the coauthoring session of the electronic document, wherein during the coauthoring session an edit is made to a first instance of the electronic document at the first endpoint computing device by a first user while, substantially simultaneously, an edit is made to a second instance of the electronic document at a second endpoint computing device by a second user, and wherein the edit made to the second instance of the electronic document is transmitted in real time from the second endpoint computing device to the first endpoint computing device, the method, comprising:

incorporating, with the first endpoint computing device, the first edit into the first instance of the electronic document, wherein the first edit is incorporated at a first position;

receiving, at the first endpoint computing device, an indication of the transmitted edit, the indication including the transmitted edit and a specified position to incorporate the transmitted edit;

determining with the first endpoint computing device whether the specified position is prior in time or later in time to the first position;

when it is determined that the specified position is prior in time to the first position, incorporating, via the first endpoint computing device, the transmitted edit at the specified position while maintaining a real time reception at the first endpoint computing device of a subsequent edit transmitted from the second endpoint computing device;

when it is determined that the specified position is later in time to the first position:

determining, with the first endpoint computing device, an amount of content in the first instance of the electronic document affected by the first edit;

translating, with the first endpoint computing device, the specified position by the amount of content affected by the first edit to create a translated position; and incorporating, via the first endpoint computing device, the transmitted edit at the translated position while maintaining a real time reception of a subsequent edit transmitted from the second endpoint computing device;

wherein the indication of the transmitted edit further includes a vector clock array (VCA) indicating an understanding of the second instance of the electronic document at the time the second edit was made in the second instance of the electronic document;

when it is determined by the first endpoint computing device that the first position is equal to the specified position, determining an order of the first edit and the transmitted edit based on an order of vector clocks in the VCA, wherein each of the first and second endpoint computing devices is associated with one of the vector clocks in the VCA;

when it is determined by the first endpoint computing device that a vector clock associated with the first edit precedes a vector clock associated with the transmitted edit in the order of vector clocks in the VCA, determining with the first endpoint computing device that the specified position is later in time than the first position; and when it is determined by the first endpoint computing device that the vector clock associated with the transmitted edit precedes the vector clock associated with the first edit in the order of vector clocks in the VCA, determining with the first endpoint computing device that the specified position is prior in time to the first position.

11. The computer-implemented method of claim 10, wherein the first edit removes content from a section of the first instance of the electronic document, wherein the amount of content affected by the first edit is a number of characters removed from the first instance of the electronic document, wherein creating the translated position includes reducing the specified position by a positional value corresponding to the number of characters removed.

12. The computer-implemented method of claim 10, wherein the first edit adds content to a section of the first instance of the electronic document, wherein the amount of content affected by the first edit is a number of characters added to the first instance of the electronic document, wherein creating the translated position includes increasing the specified position by a positional value corresponding to the number of characters added.

13. The computer-implemented method of claim 10, wherein an offset is applied between the first edit and the transmitted edit when the transmitted edit is incorporated into the first instance of the electronic document.

14. A computer-implemented method enabling an endpoint computing device to resolve a placement of an edit occurring in a coauthoring session of an electronic document, wherein a first endpoint computing device participating in a coauthoring session of an electronic document, wherein during the coauthoring session an edit is made to a first instance of the electronic document at the first computing device by a first user while, substantially simultaneously, an edit is made to a second instance of the electronic document at a second endpoint computing device by a second user, and wherein the edit made to the second instance of the electronic document is transmitted in real time from the second endpoint computing device to the first endpoint computing device, the computer-implemented method comprising:

displaying at the first endpoint computing device the first instance of the electronic document;

receiving at the first endpoint computing device the first edit at a position in a section of the first instance of the electronic document, wherein the section is associated with a local vector clock array (VCA) of the first endpoint computing device that includes a plurality of vector clocks associated with both the first and second instance of the electronic document that reflect a state of the section in each of the first and second instance of the electronic document as known by the first instance of the electronic document;

in response to receiving the first edit, incrementing at the first endpoint computing device a vector clock associated with the first instance of the electronic document in the local VCA associated with the section;

incorporating with the first endpoint computing device the modification into the section at the position;

receiving at the first endpoint computing device an indication of the transmitted edit, the indication including a specified position to incorporate the transmitted edit in the section and a transmitted VCA that includes a plurality of vector clocks associated with each of the first and second instance of the electronic document that reflect a state of the section in each of the first and second instance of the electronic document as known by the second instance of the electronic document at a time the second edit was made in the second instance of the electronic document;

determining with the first endpoint computing device whether transmitted edit can be implemented in the first instance of the electronic document without additional edits transmitted from the second endpoint computing device based on comparing the local VCA to the transmitted VCA, wherein the comparison is performed at the first endpoint computing device;

when it is determined that the transmitted edit can be implemented in the first instance of the electronic document without additional edits transmitted from the second endpoint computing device, determining whether the transmitted remote edit was made later in time to the first edit;

when it is determined that the transmitted edit was made later in time to the first edit, translating with the first endpoint computing device the specified position to account for content in the section affected by the first edit, wherein the specified position is increased in value to account for content added to the section prior in time to the transmitted edit and decreased in value to account for content removed from the section prior in time to the transmitted edit, and incorporating with the first endpoint computing device the transmitted edit into the section at the specified position as translated while maintaining with the first endpoint computing device the reception of subsequent real time edits transmitted from the second endpoint computing device; or when it is determined that the transmitted edit was not made later in time to the first edit, incorporating with the first endpoint computing device the transmitted edit into the section at the specified position while maintaining the reception of subsequent real time edits transmitted from the second endpoint computing device; and when it is determined that the remote edit cannot be implemented in the first instance of the electronic document without additional edits transmitted from the second endpoint computing device, temporarily suspending at the first endpoint computing device real-time updates of the local instance.

\* \* \* \* \*